United States Patent
Wang et al.

(10) Patent No.: US 7,177,634 B2
(45) Date of Patent: Feb. 13, 2007

(54) METHOD OF VOICE ACCESS FOR VEHICLE SERVICES

(75) Inventors: Mingheng Wang, Rochester Hills, MI (US); Doug L. Mutart, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 430 days.

(21) Appl. No.: 10/120,168

(22) Filed: Apr. 10, 2002

(65) Prior Publication Data
US 2004/0203634 A1 Oct. 14, 2004

(51) Int. Cl.
H04M 1/66 (2006.01)
H04M 3/00 (2006.01)
G01C 21/00 (2006.01)

(52) U.S. Cl. .......................... 455/420; 455/410; 701/49
(58) Field of Classification Search ................ 455/456, 455/414; 701/33, 211
See application file for complete search history.

(56) References Cited

U.S. PATENT DOCUMENTS

| | | | |
|---|---|---|---|
| 5,631,947 A | 5/1997 | Wittstein et al. | |
| 6,148,212 A * | 11/2000 | Park et al. | 455/456.1 |
| 6,167,255 A * | 12/2000 | Kennedy et al. | 455/414.1 |
| 6,199,045 B1 * | 3/2001 | Giniger et al. | 705/1 |
| 6,330,499 B1 | 12/2001 | Chou et al. | |
| 6,580,916 B1 * | 6/2003 | Weisshaar et al. | 455/414.1 |
| 6,604,033 B1 | 8/2003 | Banet et al. | |
| 6,611,740 B2 | 8/2003 | Lowrey et al. | |
| 6,687,587 B2 * | 2/2004 | Kacel | 701/33 |
| 2002/0049535 A1 * | 4/2002 | Rigo et al. | 701/211 |
| 2002/0177926 A1 * | 11/2002 | Lockwood et al. | 701/1 |
| 2003/0061079 A1 * | 3/2003 | Noghero et al. | 705/5 |
| 2004/0044454 A1 * | 3/2004 | Ross et al. | 701/33 |
| 2004/0190693 A1 * | 9/2004 | Beiermeister | 379/88.18 |

* cited by examiner

*Primary Examiner*—Fan Tsang
*Assistant Examiner*—Lisa Hashem
(74) *Attorney, Agent, or Firm*—Anthony Luke Simon

(57) ABSTRACT

One aspect of the invention presents a method of providing vehicle services to a mobile vehicle. An access request is received at a call center. The access request is authenticated. An automated voice menu of vehicle services is presented to a subscriber. A subscriber selection input is received from the automated voice menu of vehicle services. A vehicle service control signal is sent from the call center to the mobile vehicle based on the subscriber selection input.

16 Claims, 2 Drawing Sheets

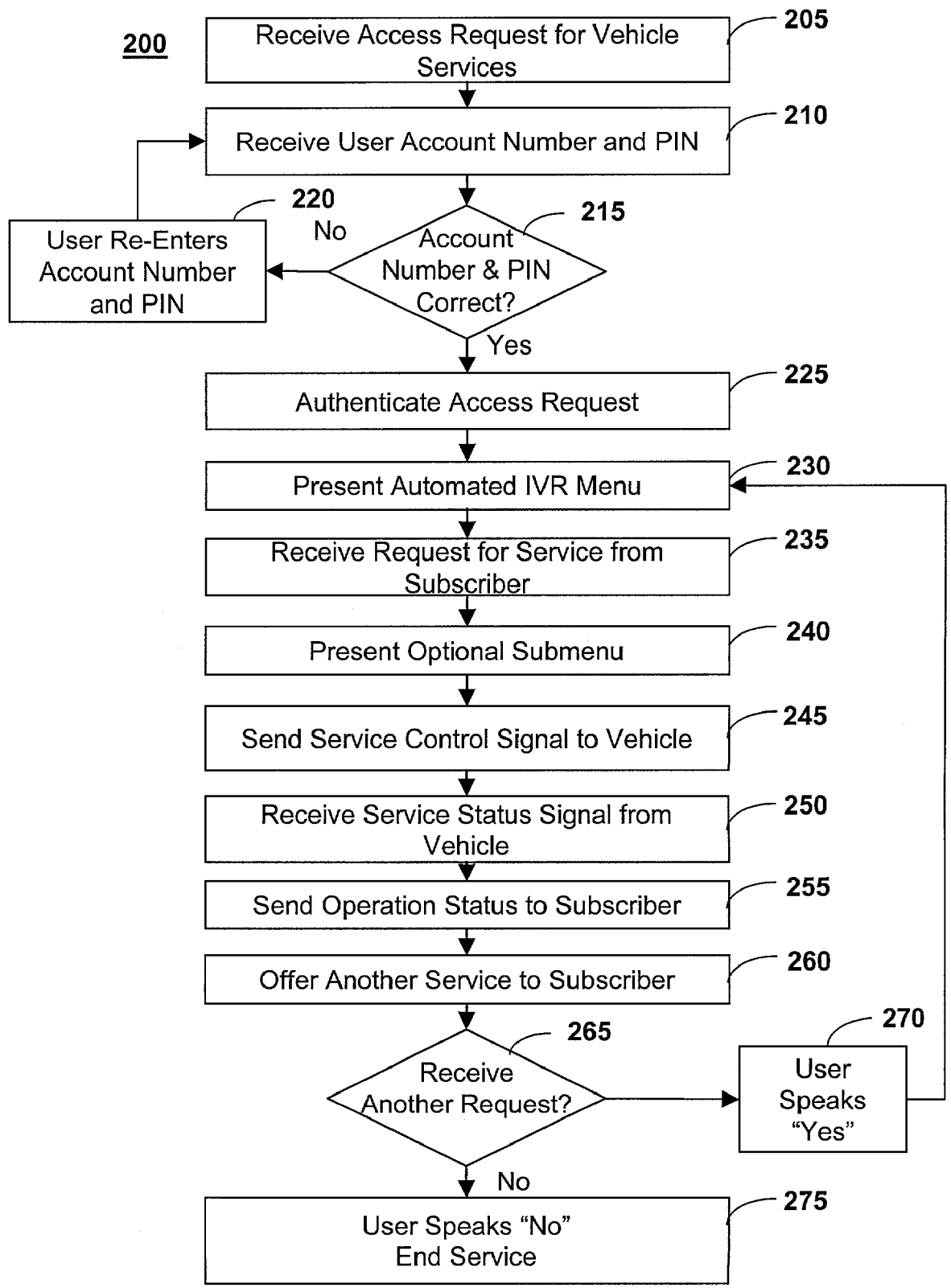

METHOD OF VOICE ACCESS FOR VEHICLE SERVICES

FIELD OF THE INVENTION

This invention relates generally to wireless methods for providing mobile vehicle services. More specifically, the invention relates to a method for accessing mobile vehicle services through a telematics call center using a voice call.

BACKGROUND OF THE INVENTION

One of the fastest growing areas of communications technology is related to automobile network solutions. Projections are that by 2006 almost all new American cars will have some level of telematics service, and with the increasing number and variety of these services, demands on telematics service call centers will grow concomitantly. Currently, most telematics call centers rely on the resources of human advisors to process service requests, rather than on automated or virtual advisors. With the escalating demand for the personalization and the number of services, requests may not be executed quickly or successfully when the call center is over its call capacity. Calls from customers may be put on hold and service may be delayed. Thus, a greater level of automation would allow for quicker processing of requests and a larger call capacity for the telematics service call center.

Telematics call centers typically receive calls from users who want navigational, concierge, emergency, and location services. These services also may provide specialized help, for example, in unlocking doors of a vehicle when keys are locked inside, locating the geographical position of the vehicle when it has been stolen, and honking the horn of a vehicle when it cannot be located in a large parking garage.

An alternative approach for processing normal as well as more specialized requests from telematics subscribers would not require human advisors. In addition, this type of more automated service access would allow the telematics subscriber to call from any phone and request vehicle services via an automated call system in a timely and effective manner.

It is an object of this invention, therefore, to provide a method for accessing telematics services for a mobile vehicle using a voice call, which overcomes the deficiencies and obstacles described above.

SUMMARY OF THE INVENTION

One aspect of the invention presents a method of providing vehicle services to a mobile vehicle. An access request may be received at a call center. The access request may be authenticated. An automated voice menu of vehicle services may be presented to a subscriber. A subscriber selection input may be received from the automated voice menu of vehicle services. A vehicle service control signal may be sent from the call center to the mobile vehicle based on the subscriber selection input.

The access request may be received from one of a landline phone or a cellular phone. The access request may be received by an automated voice response system. Authenticating the access request may comprise comparing a user account number and a personal identification number to a database of user account numbers and personal identification numbers.

The automated voice menu of vehicle services may be based on the user account number. The automated voice menu of vehicle services may be based on a mobile vehicle corresponding to the user account number. The automated voice menu of vehicle services may be based on a type of service class associated with the user account number.

The vehicle services may include a lock door request, an unlock door request, a honk horn request, a flash lights request, a vehicle diagnostics check request, a vehicle parameter check request, and a vehicle parameter update request.

An automated voice submenu may be presented based on a subscriber selection input. A vehicle service status signal may be received and a vehicle service status may be presented to the subscriber based on the received vehicle service status signal.

Another aspect of this invention presents a computer usable medium including a program for providing vehicle services to a mobile vehicle. The computer program may include code to receive an access request at a call center; code to authenticate the access request; code to present an automated voice menu of vehicle services to a subscriber; code to receive a subscriber selection input from the automated voice menu of vehicle services; and code to send a vehicle service control signal from the call center to the mobile vehicle based on the subscriber selection input.

The program may authenticate the access request by comparing a user account number and a personal identification number to a database of user account numbers and personal identification numbers. The automated voice menu of vehicle services may be based on the user account number. The automated voice menu of vehicle services may be based on a mobile vehicle corresponding to the user account number, or based on a type of service class associated with the user account number.

The computer program may include code to present an automated voice submenu based on a subscriber selection input. The computer program may include code to receive a vehicle service status signal and to present a vehicle service status to the subscriber based on the received vehicle service status signal.

Another aspect of the invention presents a system for providing vehicle services to a mobile vehicle including a means for receiving an access request at a call center; a means for authenticating the access request; a means for providing an automated voice menu of vehicle services to a subscriber; a means for receiving a subscriber selection input from the automated voice menu of vehicle services; and a means for sending a vehicle service control signal from the call center to the mobile vehicle based on the subscriber selection input.

The system for providing vehicle services may include a means for providing an automated voice submenu based on a subscriber selection input. The system may include a means for receiving a vehicle service status signal; and a means for presenting a vehicle service status to the subscriber based on the received vehicle service status signal.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method for accessing telematics services for a mobile vehicle, in accordance with the current invention.

DETAILED DESCRIPTION OF THE PRESENTLY PREFERRED EMBODIMENTS

Figure 1:
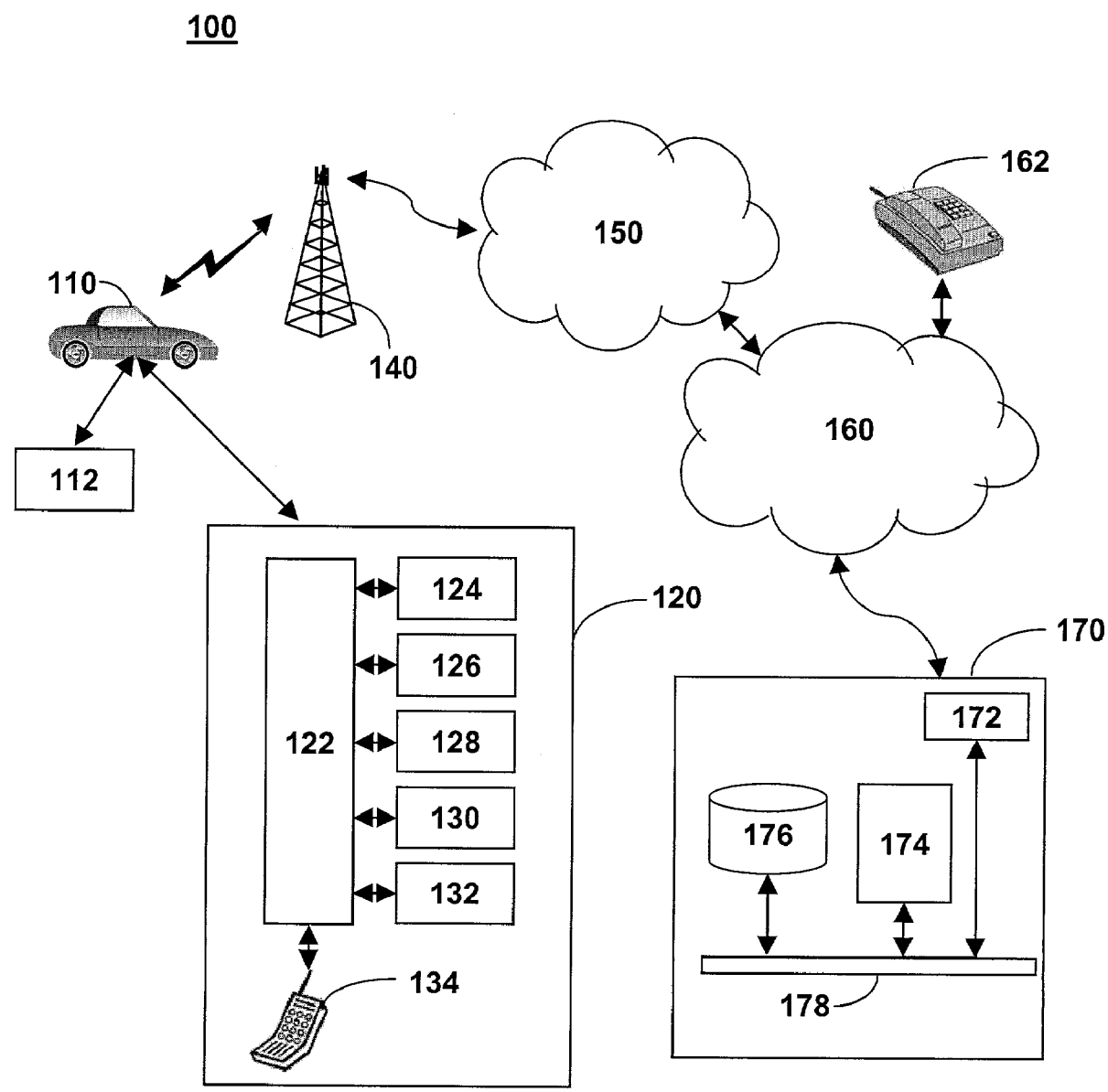
FIG. 1 is an illustration of one embodiment of a system for accessing telematics services for a mobile vehicle, in accordance with the current invention.

FIG. 1 illustrates one embodiment of a system for accessing telematics services for a mobile vehicle, in accordance with the present invention at 100. Mobile vehicle service system 100 may be enabled by a voice call connection between a telematics subscriber and telematics service call center using interactive voice response and voice extensible mark-up language technologies.

Mobile vehicle service system 100 may include a mobile vehicle 110, a telematics unit 120, one or more wireless carrier systems 140, one or more communication networks 150, one or more land networks 160, and one or more call centers 170.

Mobile vehicle 110 may be a mobile vehicle equipped with suitable hardware and software for transmitting and receiving voice and data communications. Mobile vehicle 110 may contain a vehicle computer 112 that is connected to and controls a variety of diagnostics, actuators, sensors, controllers, and vehicle parameters. Vehicle computer 112 may access information from and control vehicle actuators and controls such as door locks, a car horn, a trunk release, an alarm system and headlights. DSP 122 may control operation modes within the vehicle, such as activating an anti-lock brake system, and adjusting vehicle parameters or features like climate-control, heated seat or comfort settings.

Mobile vehicle 110 may contain telematics unit 120, which may include a digital signal processor (DSP) 122 connected to a wireless modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone. GPS unit 126 may provide longitude and latitude coordinates of mobile vehicle 110.

DSP 122 may execute various computer programs that control programming and operational modes of various systems within mobile vehicle 110. DSP 122 may send out signals to activate the programming mode and operation modes, as well as provide input data. Signals from DSP 122 may be rendered for a visual display device, as well as translated into voice messages and sent out through speaker 132.

A vehicle service application may be installed in DSP 122 to provide information on and communicate with vehicle computer 112. DSP 122 may access information and diagnostics from vehicle computer 112. DSP 122 may send requests to vehicle computer 112 to perform diagnostics or control operation modes, such as reading an odometer, checking fuel levels, turning off lights, and unlocking doors. DSP 122 may access information from a global positioning system. DSP 122 may control operations modes within telematics unit 120, such as activating the mobile phone of the vehicle or initiating a phone call.

Mobile vehicle 110 via telematics unit 120 may send and receive radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Land network 160 may be a public-switched telephone network. Land network 160 may be an Internet protocol (IP) network. Land network 160 may be comprised of a wired network, an optical network, a fiber network, another wireless network, or any combination thereof. Land network 160 may be connected to one or more landline telephones 162. Land network 160 may connect communication network 150 to call center 170. Communication network 150 and land network 160 may connect wireless carrier system 140 to a communication node or call center 170.

Call center 170 may contain one or more voice and data switches 172, one or more telematics service servers or telematics service managers 174, one or more telematics services databases 176, and one or more bus systems 178.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Switch 172 may be connected to land network 160. Switch 172 may transmit voice or data transmissions from call center 170. Switch 172 also may receive voice or data transmissions from telematics unit 120 in mobile vehicle 110 through wireless carrier system 140, communication network 150, and land network 160. Switch 172 may receive from or send to one or more telematics service managers 174 data transmissions via one or more bus systems 178.

Telematics service manager 174 may be any suitable hardware and software capable of providing requested telematics services to telematics unit 120 in mobile vehicle 110. Telematics service manager 174 may send to or receive from one or more telematics services databases 176 data transmissions via bus system 178.

Telematics service manager 174 may provide one or more of a variety of services, including enrollment services, concierge services, navigation assistance, directory assistance, roadside assistance, business or residential assistance, information services assistance, emergency assistance, and communications assistance. Telematics service manager 174 may transmit data to telematics unit 120 in mobile vehicle 110 through wireless carrier system 140, communication network 150, land network 160, voice and data switch 172, and bus system 178. Telematics service manager 174 may store or retrieve data and information from telematics services database 176.

Vehicle services may be offered to mobile vehicle 110 with an advisor's assistance from call center 170 via wireless modem 124, wireless carrier system 140, communication network 150, and land network 160. One embodiment of the present invention provides an alternative where landline phone 162 or a cellular phone other than mobile phone 134 may initiate a vehicle service request to call center 170.

Landline phone 162 or another cellular phone not connected with the vehicle may send and receive voice calls that relay information pertinent to providing services to mobile vehicle 110. These calls, by using interactive voice response (IVR) and voice extendable markup language (voice-XML) technologies, may help the telematics subscriber to interact with telematics service manager 174 and access various services provided by call center 170. Menu-driven options of the voice commands may be translated into voice-XML data that may be received and processed by telematics service manager 174 and stored in telematics services database 176. Telematics service manager 174 then may send directives to telematics unit 120 to perform functions within telematics unit 120, or to relay command signals through telematics unit 120 to vehicle computer 112, which in turn may control a variety of diagnostics, actuators, sensors, controllers, and vehicle parameters.

FIG. 2 shows a flow diagram of one embodiment of a method for providing vehicle services to a mobile vehicle, in accordance with the present invention at 200. Telematics service access method 200 comprises steps in which a telematics subscriber may request one or more vehicle services by interacting with an automated and interactive voice response system (IVR) of a telematics call center.

A telematics subscriber may place a call to a telematics service call center to request access to telematics services for a mobile vehicle, as seen at block 205. The requested vehicle service may be, for example, a lock door request, an unlock door request, a honk horn request, a flash lights request, a vehicle diagnostics check request, a vehicle parameter check request, and a vehicle parameter update request. The subscriber may want to control or adjust some operation mode and to receive information or diagnostics from a mechanical, electrical, environmental or communication system of the vehicle.

The call center may receive the access request by an automated voice response system. As part of telematics service manager 174, the automated and interactive voice response (IVR) system may include a telephone server application to manage call answering, routing and management, data flow, and automatic voice recognition. The IVR system may consist of, for example, voice-XML browser software that parses and implements voice-XML, a voice-recognition engine that converts spoken words to text and acoustic data optimized for the telephony environment, a text-to-speech engine that converts text input to spoken output for playback of recognized text and application prompts, and various management software tools.

The subscriber may have set up an account previously by calling the call center and giving personal information such as name, address, telephone number, vehicle identification number, credit card name, credit card number, and credit card expiration date. The subscriber may have received an account number and PIN to expedite future call requests. The call center may have stored personal information in a database that would be accessed during future calls requesting.

The telematics service request may be received from the subscriber, and the call center may send a message prompting the user to input a user account number and a personal identification number (PIN). The call center may receive the user account number and PIN, as seen in block 210. A telematics service application in the call center may compare the given account number and PIN to recorded numbers in the subscriber profile stored in the telematics service database to see if the entered account number and PIN are correct, thereby authenticating the user, as seen at block 215. When the account number and PIN are not correct, the user may be prompted to reenter the numbers. The user may enunciate the digits of the account number and PIN again, as seen at block 220, which the call center may receive, as seen back at block 210.

The automated interactive voice response (IVR) system may authenticate the access request, as seen at block 225. Then the IVR system may present an automatic voice menu, listing the service options available to the telematics subscriber, as seen at block 230. The selections or options that are presented in the voice menu may be based on the user account number, which indicates what services are available and associated with a particular subscriber or user.

The menu of services may be based on a mobile vehicle corresponding to the user account number. The particular vehicle may or may not be equipped or enabled to respond to a particular call center request or provide certain services. For example, the menu would not include the option to activate the heater in a seat if the vehicle were not so equipped. The menu would not list, for example, alarm disengagement service for a vehicle with no alarm system.

The menu of services may be based on a type of service class associated with the user account number. In other words, the availability of vehicle services may be dependent on a particular service plan or level of service chosen by the subscriber.

The call center may receive the request, as seen at block 235. The request may be transmitted by an interactive voice response application and translated into voice-XML data that may be distributed to the appropriate service application that controls the requested service. When there are more selections possible within the selected service, the IVR system may present a submenu listing further options, as seen at block 240. For example, the car seat heater option may allow the subscriber to choose a particular temperature setting from a submenu. When a request is completed with all appropriate options chosen, the data may be recorded and stored in the telematics service database.

The call center may send a vehicle service control signal to perform the service selected by the telematics subscriber, as seen at block 245. The call center may send this digital control signal via land network 160, communication network 150, and wireless carrier system 140 to telematics unit 120 in mobile vehicle 110 with instructions for controlling and performing some operation of or adjustment to an internal system, function or setting of the mobile vehicle.

The call center may send the vehicle service control signal by using over-the-air service provisioning (OTASP) specified in TIA/EIA/IS-683-A (1998), "Over-the-Air Service Provisioning of Mobile Stations in Spread Spectrum Systems." Another way may be through an air interface function (AIF) with a connection directly to a call center. The AIF may contain a data string with a header, a command, and possibly one or more fields.

The vehicle service control signal also may be sent from the call center to the telematics unit using a short messaging service (SMS) of a wireless carrier, sending and receiving short messages according to established protocols such as IS-637 standards for short message service (SMS), IS-136 air interface standards for SMS, and GSM 03.40 and 09.02 standards. SMS-based services may use a variety of protocols such as those approved by the European Telecommunication Standards Institute (ETSI): SMPP, CIMD, UCP/EMI, and SMS0. Similar to paging, an SMS communication may be posted along with an intended recipient, such as a telematics unit in mobile vehicle 110.

No matter which way the service control signal is sent, it may be received through the modem and processed in the DSP of the telematics unit. In some cases, there may be a delay in receiving the control signal if the telematics unit has been placed into a discontinuous receive (DRx) mode or sleeping mode. Typically the vehicle communications may be periodically awakened, perhaps every five to ten minutes, to a service-ready mode, during which it may receive a communication with service instructions.

The call center may receive a service status signal back from the vehicle indicating whether the requested operation or service has been performed successfully, as seen at block 250.

Information on the status of the requested operation or adjustment may be given to the subscriber via the automatic IVR system, as seen at block 255. Information on the operation may be stored in the in-vehicle memory of the telematics unit, as well as the telematics service database at the call center.

After a service has been performed and its status has been given to the subscriber, the voice-activated response system may offer another service by asking if the telematics subscriber wishes to request another service, as seen at block 260. The call center may or may not receive another request, as seen a block 265.

The subscriber may want another service and may indicate so in the affirmative by speaking "yes" or another predetermined response, as seen at block 270. At this point, the process of offering and selecting another telematics service may begin again with a reiterated description and menu selection of the available telematics services, as seen back at block 230.

The subscriber may not want another service and may indicate so by speaking "no" or another predetermined response, as seen at block 275. The call may be terminated and the method for accessing telematics services may end.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing vehicle services to a mobile vehicle comprising:
   receiving an access request at a call center;
   authenticating the access request;
   presenting an automated voice menu of vehicle services to a subscriber, the automated voice menu presenting selections based on a service class associated with a user account number;
   receiving a subscriber selection input from the automated voice menu of vehicle services; and
   sending a vehicle service control signal from the call center to the mobile vehicle based on the subscriber selection input.

2. The method of claim 1 wherein the access request is received from one of a landline phone or a cellular phone.

3. The method of claim 1 wherein the access request is received by an automated voice response system.

4. The method of claim 1 wherein authenticating the access request comprises comparing a user account number and a personal identification number to a database of user account numbers and personal identification numbers.

5. The method of claim 4 wherein the automated voice menu of vehicle services is based on a mobile vehicle corresponding to the user account number.

6. The method of claim 1 wherein at least one vehicle service is selected from a group consisting of a lock door request, an unlock door request, a honk horn request, a flash lights request, a vehicle diagnostics check request, a vehicle parameter check request, and a vehicle parameter update request.

7. The method of claim 1 further comprising:
   providing an automated voice submenu based on a subscriber selection input.

8. The method of claim 1 further comprising:
   receiving a vehicle service status signal; and
   presenting a vehicle service status to the subscriber based on the received vehicle service status signal.

9. A computer usable medium including a program for providing vehicle services to a mobile vehicle comprising:
   computer program code to receive an access request at a call center;
   computer program code to authenticate the access request;
   computer program code to present an automated voice menu of vehicle services to a subscriber, the automated voice menu presenting selections based on a service class associated with a user account number;
   computer program code to receive a subscriber selection input from the automated voice menu of vehicle services; and
   computer program code to send a vehicle service control signal from the call center to the mobile vehicle based on the subscriber selection input.

10. The computer usable medium of claim 9 wherein authenticating the access request comprises comparing a user account number and a personal identification number to a database of user account numbers and personal identification numbers.

11. The computer usable medium of claim 10 wherein the automated voice menu of vehicle services is based on a mobile vehicle corresponding to the user account number.

12. The computer usable medium of claim 9 further comprising:
   computer program code to present an automated voice submenu based on a subscriber selection input.

13. The computer usable medium of claim 9 comprising:
   computer program code to receive a vehicle service status signal; and
   computer program code to present a vehicle service status to the subscriber based on the received vehicle service status signal.

14. A system for providing vehicle services to a mobile vehicle, comprising:
   means for receiving an access request at a call center;
   means for authenticating the access request;
   means for presenting an automated voice menu of vehicle services to a subscriber, the automated voice menu presenting selections based on a service class associated with a user account number;
   means for receiving a subscriber selection input from the automated voice menu of vehicle services; and
   means for sending a vehicle service control signal from the call center to the mobile vehicle based on the subscriber selection input.

15. The system of claim 14 further comprising:
   means for presenting an automated voice submenu based on a subscriber selection input.

16. The system of claim 14 further comprising:
   means for receiving a vehicle service status signal; and
   means for presenting a vehicle service status to the subscriber based on the received vehicle service status signal.

* * * * *